(12) United States Patent
Waissbein et al.

(10) Patent No.: US 8,146,135 B2
(45) Date of Patent: *Mar. 27, 2012

(54) ESTABLISHING AND ENFORCING SECURITY AND PRIVACY POLICIES IN WEB-BASED APPLICATIONS

(75) Inventors: Ariel Waissbein, Buenos Aires (AR);
Ariel Futoransky, Buenos Aires (AR);
Diego Bartolome Tiscornia, Buenos Aires (AR); Ezequiel David Gutesman, Buenos Aires (AR)

(73) Assignee: Core SDI, Incorporated, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/909,615

(22) Filed: Oct. 21, 2010

(65) Prior Publication Data

US 2011/0113468 A1 May 12, 2011

Related U.S. Application Data

(63) Continuation of application No. 11/264,114, filed on Oct. 31, 2005, now Pat. No. 7,831,995.

(60) Provisional application No. 60/623,449, filed on Oct. 29, 2004, provisional application No. 60/724,976, filed on Oct. 7, 2005.

(51) Int. Cl.
G06F 29/06 (2006.01)
(52) U.S. Cl. ............. 726/1; 713/189; 713/182; 709/174
(58) Field of Classification Search ................... 726/1
See application file for complete search history.

(56) References Cited

U.S. PATENT DOCUMENTS

| | | | |
|---|---|---|---|
| 7,277,937 B2 | 10/2007 | Caceres et al. | |
| 7,636,945 B2 | 12/2009 | Chandnani et al. | |
| 7,694,328 B2 | 4/2010 | Joshi et al. | |
| 7,774,831 B2 | 8/2010 | Kuznetsov et al. | |
| 7,831,995 B2 | 11/2010 | Futoransky et al. | |
| 2002/0157020 A1 | 10/2002 | Royer | |
| 2005/0203921 A1 | 9/2005 | Newman et al. | |
| 2005/0251863 A1 | 11/2005 | Sima | |

OTHER PUBLICATIONS

Futoransky, Ariel, Gutesman, Ezequiel and Waissbein, Ariel, A Dynamic Technique for Enhancing the Security and Privacy of Web Applications, Presented at the Black Hat USA 2007 Briefings, Aug. 1-2, 2007, Las Vegas, Nevada.

Futoransky, Ariel and Waissbein, Ariel, Enforcing Privacy in Web Applications; presented at the Third Annual Conference on Privacy, Security and Trust, Oct. 12-14, 2005.

*Primary Examiner* — Taghi Arani
*Assistant Examiner* — Mahfuzur Rahman
(74) *Attorney, Agent, or Firm* — Peter A. Nieves; Sheehan Phinney Bass + Green, PA

(57) ABSTRACT

Method, system, and computer code for implementing privacy protection in a web application, wherein the web application is executed in a web application language execution environment within a web server, the method containing the steps of: establishing at least one inbound tagging rule for tagging objects entering the web application language execution environment, referred to as inbound objects, according to a respective source of each of the inbound objects; assigning a tag to at least one of the inbound objects being operated on by the web application language execution environment based on the at least one inbound tagging rule; establishing at least one privacy rule for performing privacy actions on at least one object that is outbound from the web application language execution environment, referred to as outbound objects, according to a respective tag of each of the outbound objects; and performing a privacy action on the at least one outbound object being operated on by the web application language execution environment based on the at least one privacy rule.

17 Claims, 6 Drawing Sheets

FIG. 6

```xml
<?xml version="1.0" encoding="UTF-8" ?>

<graspdb host="www.shomewhere.com">
    <security>
        <SQL_injection block="true" log="true" />
        <shell_injection block="true" log="true" />
        <directory_traversal block="true" log="true" />
        <XSS block="true" log="true" />
    </security>
    <privacy_policy>
        <descriptors>
            <inbound>
                <descriptor name="database" target="mysql" method="mysql" />
                <descriptor name="login.job.title" target="login.html#job_title" method="http-get" />
                <descriptor name="login.email" target="login.html#email" method="http-get" />
                <descriptor name="login.phone" target="login.html#phone" method="http-get" />
                <descriptor name="login.company" target="login.html#company" method="http-get" />
                <descriptor name="login.city" target="login.html#city" method="http-get" />
                <descriptor name="login.URL" target="login.html#URL" method="http-get" />
            </inbound>
            <outbound>
                <descriptor name="anyHTML" target="?.html" method="http-post" />
                <descriptor name="login.confirm" target="login_confirm.html" method="http-post: />
                <descriptor name="database" target="mysql" method="mysql"
            <outbound>
        </descriptors>
        <rules>
            <tagging>
                <rule from="loging.job.title, loging.email, login.phone,
                    login.company, login.city, login.URL"
                    tagAs="private=yes,storeAllowed=yes"/>
            </tagging>
            <blocking>
                <rule to="anyHTML" whenTaggedAs="private=yes" do="block,log" />
                <rule to="database" whenTaggedAs="do.not.store=yes" do="block" />
            </blocking>
        </rules>
    </privacy_policy>
</graspdb>
```

FIG. 7

CORE IMPACT Demo Request

Contact information

Items marked with '*' are required information. Thank you.

Salutation *: Mr. ▽
First Name *: John|
Last Name *:
Job Title *:
Email Address *:
Phone Number *:
Industry *: Select One ▽
Company *:
City *:
State/Province/Region *:
URL *:
Country *: Select a Country ▽

Penetration Testing Information

ESTABLISHING AND ENFORCING SECURITY AND PRIVACY POLICIES IN WEB-BASED APPLICATIONS

CROSS-REFERENCE TO RELATED APPLICATIONS

This application is a continuation of, and claims priority to, copending U.S. nonprovisional patent application entitled "Establishing and Enforcing Security and Privacy Policies in Web-Based Applications," having Ser. No. 11/264,114, filed Oct. 31, 2005, which claims priority to U.S. Provisional Patent Application No. 60/623,449, filed Oct. 29, 2004, and No. 60/724,976, filed Oct. 7, 2005, all of which are incorporated herein by reference.

BACKGROUND OF THE INVENTION

1. Field of the Invention

This invention relates to establishing and enforcing security and privacy policies in web-based applications by controlling the way in which data is represented and handled by the web application and by controlling the communication of the data between web browsers and the various components of the web application.

2. Related Art

In the last few decades, society has experienced an explosive development in information technology and its application in both government and corporate sectors. Computer systems and computer networks are being increasingly used to manage, communicate, and manipulate information, and to establish all sorts of transactions. This boom in computer systems and computer technology and, in particular, the establishment of the World-wide Web (WWW or "Web"), which is part of the Internet, as a pervasive medium of communication have contributed to create an environment in which web-based applications act as key components of government agencies and corporations. The technology boom and the new role of the WWW in society have all contributed to the growth of various disciplines associated with web development. Under such disciplines, static, brochure-oriented websites have given way to web-based applications that dynamically interact with web users via integrated, heterogeneous applications in multi-tier web environments.

The global nature of the WWW, and the increasing dependence organizations have on web-based applications, has also revealed its shortcomings. Web-based applications run vital processes, store sensitive information, and are accessible 24 hours a day, seven days a week, to potential attackers. For example, sensitive data, which is typically accessed within web-based applications as proprietary information, financial records, etc., can be stolen, deleted, and/or modified by an attacker. Hence, there is a need for web-based applications having reliable security and that are capable of enforcing privacy policies.

Web security violations are occurring with increasing frequency, as shown by various statistics, including, for example, at www.cert.org, which is the website for the Computer Emergency Response Team (CERT) at the Software Engineering Institute (SEI), Carnegie Mellon University, Pittsburgh, Pa. Moreover, we are presented with a non-stop flood of security advisories, which makes it apparent that the necessary security precautions and concerns were not taken sufficient consideration during the recent expansion of the Web and web development technologies.

These security problems have been addressed with certain infrastructure security solutions, such as, for example, firewalls, network or host-based intrusion detection systems (IDS), and intrusion prevention systems (IPS). It is however, apparent from the statistics discussed above, that present web-based applications are not completely protected by these mechanisms.

These problems have also been addressed by tailoring and enforcing security policies for each web application in order to restrict the access that users have to the application program interfaces (APIs) in the back end of a web application, which are discussed in further detail below. However, if a web application does not establish sufficiently restrictive access policies, any user could forward data, e.g., by crafting a special page request or cookie, to the web application, which in turn would be formatted and forwarded to one of the APIs in the back end of the web application, where it might be interpreted as a compliant (but security-policy-violating) instruction and result in a successful attack. The impact of such web application attacks can be critical, as the attacker might be able to control the databases at will, bypass authentication mechanisms, execute arbitrary code on the web applications' server, or even on other users' computers (e.g., by cross-site scripting attacks), etc.

Many conventional security modules for addressing web application security are lacking in functionality and do not completely and reliably prevent the types of attacks discussed above. Such modules combine signature-based attack detection with certain additional statistic-based methods. Often they are provided as stand-alone computers installed between the firewall/IDS and the web server (i.e., they must be run on a computer separate from the one on which the servers are hosted). These conventional approaches tend to be expensive, because they must run on very fast and efficient machines, so as not to slow down the web application. These conventional security modules are also difficult to configure, because a specialized technician is often required to adapt the security system to the custom configuration of the web application. Moreover, these approaches are largely unable to distinguish between permitted and forbidden operations with an acceptable incidence of false-positives and false-negative alerts—so that some attacks will go through undetected and some compliant commands will be blocked.

Another aspect of the web application problematic concerns the privacy of data stored in web applications that one wishes to protect, e.g., personal, confidential, financial, health-related, or other types of sensitive information, transmitted between users and web applications. Such data may be the target of the exploitation methods discussed above, as well as other types of attacks. Typically, a web application may require personal data for processing by the back end web application, but such information should be handled in accordance with a preset privacy policy.

For example, credit card information for clients of a web-based retailer, i.e., an "e-tailer," should be available to the business application that processes the sales transactions, and it may also be available to its owner during use of the web application, e.g., so the owner can store and modify such information for use in making future purchases. However, no user should be able to access another user's credit-card information.

Conventional web scripting languages, such as those mentioned above, do not include explicit mechanisms to prevent the theft of private information. As a result, an attacker may take advantage of a development error in the presentation layer (i.e., front end) or logical layer (i.e., middle end) of the web-based application to obtain, delete, or manipulate sensitive information. For example, in the case of a web-based e-tailer, an attacker may be able to steal the complete credit card database and/or process unauthorized purchase orders. Such development flaws and/or errors are far more complex than described above, and in fact, can be very difficult to detect and eradicate. Moreover, improper implementation and enforcement of privacy policies may result in immediate harm to users and may also damage the reputation of the organization that owns the web-based application.

To our knowledge, today, no other solutions have been proposed for enforcing privacy policies in web applications. However, some conventional security products serve this purpose implicitly. These conventional products for and approaches to enforcing privacy policies generally lack flexibility and expressiveness. The "Privacy Bird," relates to privacy policy visualization (Lorrie Faith Cranor, Manjula Arjula, and Praveen Guduru, "Use of a P3P user agent by early adopters", WPES '02: Proceedings of the 2002 ACM workshop on Privacy in the Electronic Society, Washington, D.C., ACM Press, pp. 1-10, 2002, ISBN 1-58113-633-1); as well as the efforts of the World Wide Web Consortium to establish a common language for describing privacy policies ("The Platform for Privacy Preferences 1.0 ({P3P1.0}) Specification", L. F. Cranor, M. Langheinrich, M. Marchiori, M. Presler-Marshal, and J. Reagle, World Wide Web Consortium Recommendation. URL: http://www.owasp.org; see also Lorrie Faith Cranor, "Web Privacy with P3P Web privacy with P3P", O'Reilly & Associates, 2002).

Thus, current solutions for web application security are often inadequate. Conventional application development languages are inherently insecure, and many web developers are not skilled enough to produce sufficiently secure products based on these languages. Moreover, conventional attack-prevention solutions are far from infallible, and in some instances, may actually have the effect of degrading security.

Current solutions for web-based privacy are also inadequate, as there currently are no solutions for allowing an individual who is responsible for web-based privacy, e.g., a "security officer," to define a privacy policy with sufficient flexibility and expressiveness and to enforce this policy consistently. Therefore, under conventional approaches, both security and privacy need to be enforced through careful implementation and require constant auditing.

Security and privacy measures must be properly designed and implemented in order to prevent unauthorized manipulation of commands or data. As a result, web applications have become increasingly difficult to protect. In view of the shortcomings discussed above, there is a need for a system and method for maintaining security in web-applications that overcomes the drawbacks of the conventional technologies.

SUMMARY OF THE INVENTION

The system of the present invention enhances security and privacy for web-based applications by modifying the execution environment for the web application in order to include data-tracking information, e.g., tags. The use of such data-tracking information makes it possible to prevent many types of security attacks and privacy-policy violations. Many different web scripting languages, including, for example, PHP hypertext preprocessor (PHP), Windows Active Server Pages (ASP), .NET, common-gateway interface (CGI), Java Virtual Machine, Python, and Pen can be protected. The system includes functionalities that help prevent typical exploitation methods, such as, for example, database-injection attacks, shell-code injection attacks, cross-site scripting attacks and directory-traversal attacks. Moreover, it allows the system owner to define privacy policy in a language with good flexibility and expressiveness and have this policy enforced in an efficient and consistent fashion. The system consequently helps prevent the theft of sensitive data, such as credit card information, as well as helping to avert information leakage.

In one aspect, the present invention provides a method, system, and computer code for implementing security and privacy policy in a web application having an execution environment in which a representation of each object handled by the execution environment accommodates data and an associated tag. At least one inbound tagging rule is established for tagging inbound objects according to a respective source of each of the inbound objects. A tag is assigned to an object being operated on by the execution environment based on the at least one inbound tagging rule. At least one security/privacy rule is established for performing security/privacy actions on outbound objects according to a respective tag of each of the outbound objects. A security/privacy action is performed on the object being operated on by the execution environment based on the at least one security/privacy rule.

In another aspect, the present invention provides a system for implementing security and privacy policy in a web application. The system includes a web server configured for connection to a user computer via a network, the web application running on the web server and having an execution environment in which a representation of each object handled by the execution environment accommodates data and an associated tag. The system further includes a configuration module for storing at least one inbound tagging rule for tagging inbound objects according to a respective source of each of the inbound objects, and storing at least one security/privacy rule for performing security/privacy actions on outbound objects according to a respective tag of each of the outbound objects. A first security module runs on the web server and is functionally positioned between the user computer and a front end of the web application. The first security module is configured to assign a tag to an object being operated on by the execution environment based on the at least one inbound tagging rule. A second security module runs on the web server and is functionally positioned between a back end of the web application and at least one back-end application. The second security module is configured to perform a security/privacy action on the object being operated on by the execution environment based on the at least one security/privacy rule.

Embodiments of the present invention may include one or more of the following features.

The source of each of the inbound objects may be represented by a data structure comprising a method of executing an inbound operation and a target of the method of executing an inbound operation. The method of executing an inbound operation may include at least one of: http-post, http-get, and mysql, or may include a database application. The target of the method of executing an inbound operation may include at least one of the following items related to the web application: a field in a web form, a field in a database, a file, or a directory.

The at least one security/privacy rule for performing security/privacy actions on outbound objects may be established according to a respective destination of each of the outbound objects. The destination each of the outbound objects may be represented by a data structure including a method of executing an outbound operation and a target of the method of executing the outbound operation. The method of executing an outbound operation may include at least one of: http-post, http-get, and mysql, or may include a database application. The target of the method of executing an outbound operation may include at least one of: a user, a web page address, and a back-end application.

The security/privacy action may include at least one of: blocking output of the object, allowing output of the object, removing sensitive information and allowing output of the object, and logging output of the object. The security/privacy action also may include assigning a tag to the object as it flows from a back end application to a middle end of the web application.

The at least one security/privacy rule may specify a type of attack, detection of which initiates the security/privacy action. The detection of the attack may include a lexical analysis of the data of the object being operated on by the execution environment.

A database command injection attack may be detected if: the tag of the object being operated on by the execution environment indicates that at least part of the data of the object is user-provided; the lexical analysis indicates that the user-provided data contains predetermined prohibited characters; and the destination of the object is a database application.

A cross-site scripting attack may be detected if the tag of the object being operated on by the execution environment indicates that at least part of the data of the object is user-provided; the lexical analysis indicates that the user-provided data comprises an hypertext markup language tag; and the destination of the object is a user.

A directory-traversal attack may be detected if the tag of the object being operated on by the execution environment indicates that at least part of the data of the object is user-provided; the lexical analysis indicates that the user-provided data contains predetermined prohibited characters; and the destination of the object is a file system.

A shell command attack may be detected if the tag of the object being operated on by the execution environment indicates that at least part of the data of the object is user-provided; the lexical analysis indicates that the user-provided data contains predetermined prohibited characters; and the destination of the object is a shell application in a file system.

The assigned tag may include at least one of: private, public, aggregated data, do not store, for this user's eyes only, and user-provided. The security/privacy action comprises at least one of blocking output of the object, allowing output of the object, removing sensitive information and allowing output of the object, and logging output of the object.

An internal operation may be performed on the object being operated on by the execution environment to generate at least one new object, in which data of the at least one new object is tagged in a manner consistent with the object from which the at least one new object is generated. The internal operation may be performed so that data of the at least one new object is tagged in accordance with at least one privacy propagation rule. The internal operation may include a string operation, and the at least one privacy propagation may be applied on a character-by-character basis.

The method of the present invention may further include presenting to a user indicators on input fields of a web form indicating the tag associated with each of the input fields in accordance with the at least one inbound tagging rule. The indicators may be presented via a plug-in in the user's web browser. An explanation of the significance of the indicators may be provided to the user.

These and other objects, features and advantages will be apparent from the following description of the preferred embodiments of the present invention.

BRIEF DESCRIPTION OF THE DRAWINGS

FIG. 6 is an example of a schema for a security and privacy policy configuration.

FIG. 7 is a screen image of a web form of an application protected by security and privacy policies.

DETAILED DESCRIPTION

Figure 1:
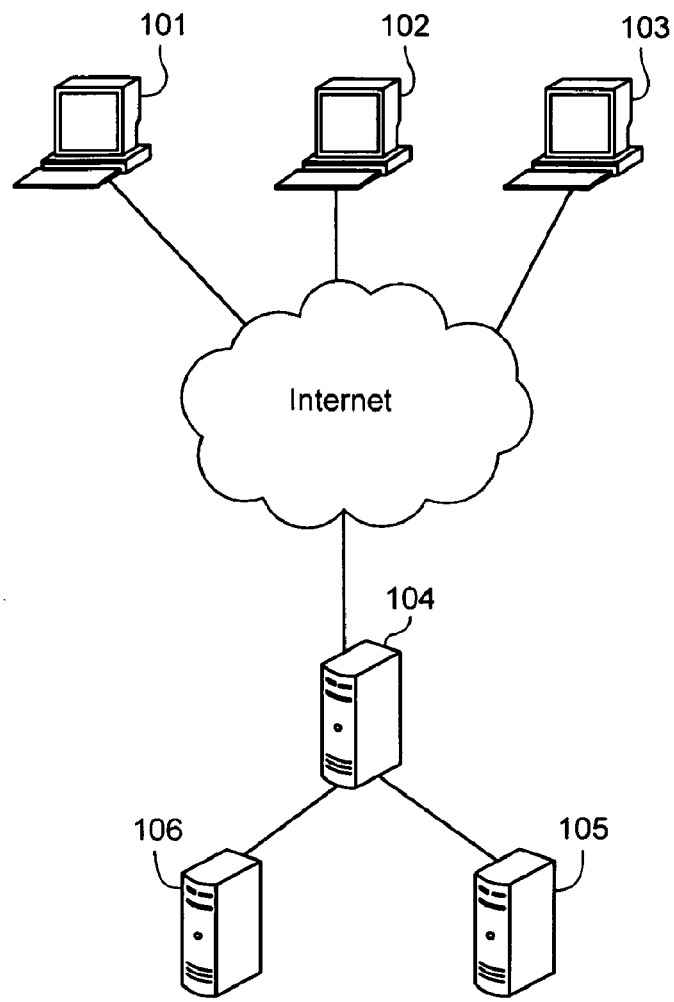
FIG. 1 is a block diagram depicting computers accessing a web application hosted on a web server, in accordance with the present invention.

As used herein, a "web application" is a computer program for providing computer-related functionality to a user via a network, such as for example, the Internet, or more specifically, the World-wide Web. Web applications may be designed by developers according to the directives of "security officers," who are responsible for creating and/or maintaining specifications relating to security and privacy, and in particular, web security and privacy. Web applications are accessed by "users" using a "web browser," which is a program configured to locate and receive data, such as text, graphics, audio and/or video data from the Web, and present that data to a user (e.g., by locating and displaying a web page, as discussed below).

When a web application is accessed by a user, a communication channel is created between the web application and the user's browser. The user may send data to the web application, such as "page requests," "cookies," and other environmental information, over the communication channel, and the user may receive "web pages" and "cookies" from the web application.

A "web page" is a document that presents electronic information to a user, such as text, graphics, audio, and video data. Web pages may be written in a markup language, such as for example, hypertext mark-up language (HTML), virtual reality modeling language (VRML), extensible mark-up language (XML), or other similar computer languages. A web page may be defined as a document or collection of documents accessible through a specific Internet address, a specific web site, or through a particular URL (Uniform Resource Locator). "Cookies" are data files containing configuration information relating to particular web applications or web sites. Such information may be used by the web application to set up a web page containing information directed specifically to a particular user. The cookies received by users may be stored in on a storage device in the user-computer (depending on browser configuration).

The infrastructure for a web application may be constituted by a "front end," a "middle end," and a "back end." The front end, or "presentation layer," provides a graphical interface between a user and a web application, which allows the user to access the web application's functionalities via a display that outputs graphical information and an input device that is configured to accept input from the user in cooperation with the display. The front end also outputs information received from the middle end by assembling a web page and presenting it to the user.

The middle end, or logical layer, handles the logical operations of the web application, which are the operations by which commands and data requests from the user are implemented in order to access desired resources via the Internet. For example, the middle end receives page requests and cookies from users and may use application program interfaces (APIs) in the back end to retrieve this information. The APIs include various routines and tools that help standardize incoming information and requests into formats that can be processed by the back end. For example, the middle end may convert information entered using a web form into a structured query language (SQL) command to access an SQL-based server, or it may use some other specific language API to access a file system. The information retrieved in this manner may be transmitted to the front end as a web page, as discussed above.

The back end may include a set of one or more computers, which are networked to the middle end and run computer programs providing the web application's core functionalities, such as for example, database engines, web-mail servers, content-management systems, and business applications. These applications may be stand-alone, end solutions, in the sense that they are created by a software developer to fulfill the desired functions, but may not include specific user interfaces. Alternatively, a web application may include only front end and a back end, in which case the front end may fulfill the roles of both the front end and the middle end discussed above.

In both cases, the front-end/middle-end server may be used to compile computer code developed in "web scripting" languages. Such code is referred to as a "web script" or simply a "script." Scripts may be executed by "interpreters" (which is a program that executes instructions written in a high-level language) or "virtual machines" (which is a self-contained operating environment that behaves as if it is a separate computer), such as, for example: PHP hypertext preprocessor (PHP), Windows Active Server Pages (ASP), .NET, common-gateway interface (CGI), Java Virtual Machine, Python, and Perl. The interpreter or virtual machine in which the script is executed may be generically referred to as the "execution environment."

For example, a web application may be used by a book retailer, i.e., a book "e-tailer," to handle book sales over the Internet. A user, i.e., a customer, may access the e-tailer's web application through the user's web browser, which makes a page request for the home webpage. The user is then presented with the home page, possibly including a welcome message, and is presented with options customized for the user.

New and previous users may be distinguished by the cookies they hold for the site, and the new users may be presented with standard offerings, while the previous users may be welcomed with target-oriented marketing information. To do so, upon receiving the user's cookies, if any, the middle end runs the "welcome script," accesses the marketing application, assembles the welcome information, and forwards it to the front-end server. In turn, the front end runs its own welcome script and assembles the webpage with special offerings, including the e-tailer's corporate logo and identifying information, and forwards it to the user.

When the user selects a product or commands a search in the user's browser, it is translated into a page request that is sent from the browser to the middle end. The middle end receives this request and runs the necessary scripts to contact the book database in the back end and retrieve the pertinent information. When the middle end receives a business transaction request, it runs the necessary scripts to access the clients' database and authenticate the client, it checks for the client's credit card information, and accesses the business application in order to perform the operation. Once the middle end has finished the transaction requested by the client and has gathered the required information, it forwards this data to the front end, which in turns generates the web page that contains the response for the client.

The present invention is concerned with the security and privacy of web applications, and, in particular, methods in which user-supplied data makes the web application behave in a way unexpected by the security officer. Many popular web applications are susceptible to these methods, which include, for example, "database-injection attacks," "shell-code injection attacks," "directory-traversal attacks," and "cross-site scripting attacks."

More specifically, in terms of security, the vulnerabilities in this class include those in which user-supplied data contains certain characters, i.e., meta-characters, whose presence affects the syntactic structure intended (by the security officer and web developers) for the underlying command strings. For example, it has been found through "penetration tests" (which is a computer security audit in which the auditor attempts to obtain unauthorized access to a targeted network in order to assess its security) that many corporate and government web-based applications deployed in the web are vulnerable to exploits from this class. The eradication of these vulnerabilities from web applications would, in turn, make most websites secure. Hence, the importance of providing solutions that address this vulnerability class.

Figure 2:
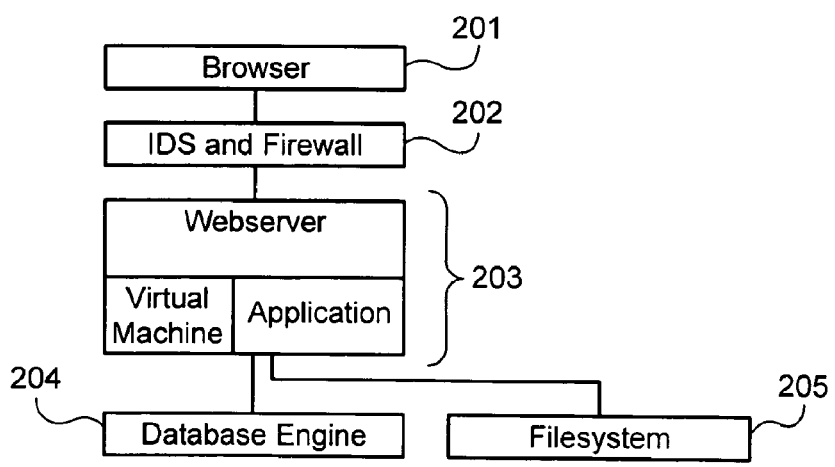
FIG. 2 is a block diagram depicting the architecture and information flow of a two-tier web application.
Figure 3:
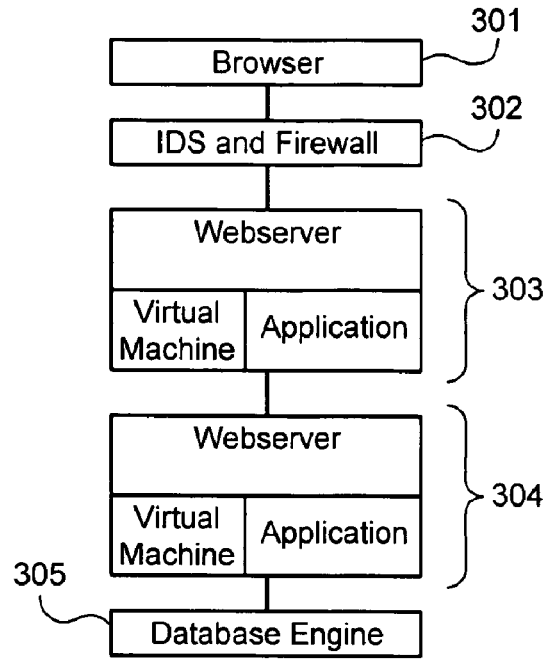
FIG. 3 is a block diagram depicting the architecture and information flow of a three-tier web application.

The present invention is applicable to various scripting languages for web applications, including, but not limiting to PHP hypertext preprocessor (PHP), Windows Active Server Pages (ASP), .NET, common-gateway interface (CGI), Java Virtual Machine, Python, and Perl. These scripting languages may be used in various web application architectures, such as the two-tier and three-tier structures discussed below, which are depicted in FIGS. 2 and 3, respectively. The following discussion therefore focuses on implementations of the present invention in a generic scripting language.

In the embodiment of the present invention shown in FIG. 1, a server, e.g., a web server 104, is connected to a network, e.g., the Internet, to provide the functionality of a web application to user-computers connected to the network. The user-computers 101, 102, 103 may be, for example, personal computers (PCs) that are connected to the Internet and have web browsers installed.

The web server 104 may be connected to a number of other servers that provide back end functionality, including, for example, application program interfaces (APIs). For example, a database server 105 provides a database engine, e.g., a SQL server application, and an associated data storage and may also provide a file system for storing files associated with the web site, e.g., image files. The database engine may be physically implemented on the same computer as the web server 104 or may be implemented on a separate computer (e.g., 105), based on parameters, such as speed, efficiency, and cost. Likewise, the data storage and file system may be physically implemented on separate computers or may be combined in various configurations on common computers.

The web server 104 may also connected to a content management system (CMS) 106, which runs a web application used for managing a web site, for example, by organizing and facilitating collaborative creation of documents and other content to be presented on the web site. The CMS 106 allows one or more authors to prepare and publish information online, without needing to prepare code, such as hypertext markup language (HTML) code. Such systems may allow information and resources, e.g., images, scripts, etc., to be stored in a database for re-use, automatic indexing and searching, and for workflow management (e.g., authorization, publication, retirement, archiving). The CMS 106 may be implemented on the same computer as the web server 104 or on a separate computer (e.g., 106), based on parameters, such as speed, efficiency, and cost.

FIG. 2 shows an example of a two-tier web application, which runs on a web server (e.g., 104), in which the present invention may be implemented. The first tier may be, for example, a combined front/middle end 203 that provides a user interface for a web site. The front/middle end 203 may include a virtual machine to compile and execute web scripts implement the functionalities of the front/middle end 203. The front/middle end 203 web application interfaces with a second tier of back end APIs, such as, for example, a database engine 204 (having an associated data storage) and a file system 205, which may be provided on the web server or on separate computers, as discussed above.

To access the web application, the user runs a web browser 201 on a user-computer (e.g., 101) connected to the web server via the Internet. The web browser 201 interfaces with a firewall/intrusion detection system (IDS) 202 running on the web server (e.g., 104) to provide security, as discussed above. The firewall/IDS 202 accepts page requests from the user's web browser 201 and passes these requests on to the web server or blocks them, if they are found to present a security risk based on conventional security parameters.

FIG. 3 shows an example of a three-tier web application, which runs on a web server (e.g., 104). The user runs a web browser 301 on a user-computer (e.g., 101) connected to the web server via the Internet. The web browser 301 interfaces with a firewall/intrusion detection system (IDS) 302 running on the web server (e.g., 104) to provide security, as discussed above.

The first tier may be, for example, a front end 303 that provides a user interface for a web site. The second tier may be, for example, a middle end 304 that provides logical layer, as discussed above. The middle end 304 interfaces with a third tier of back end APIs, such as, for example, a database engine 305 and a file system (not shown). As in the two-tier configuration, a user runs a web browser 201 on a user-computer (e.g., 101) connected to the web server (e.g., 104) via the Internet. The web browser 201 interfaces with a firewall/intrusion detection system (IDS) 202 running on the web server to provide security.

Figure 4:
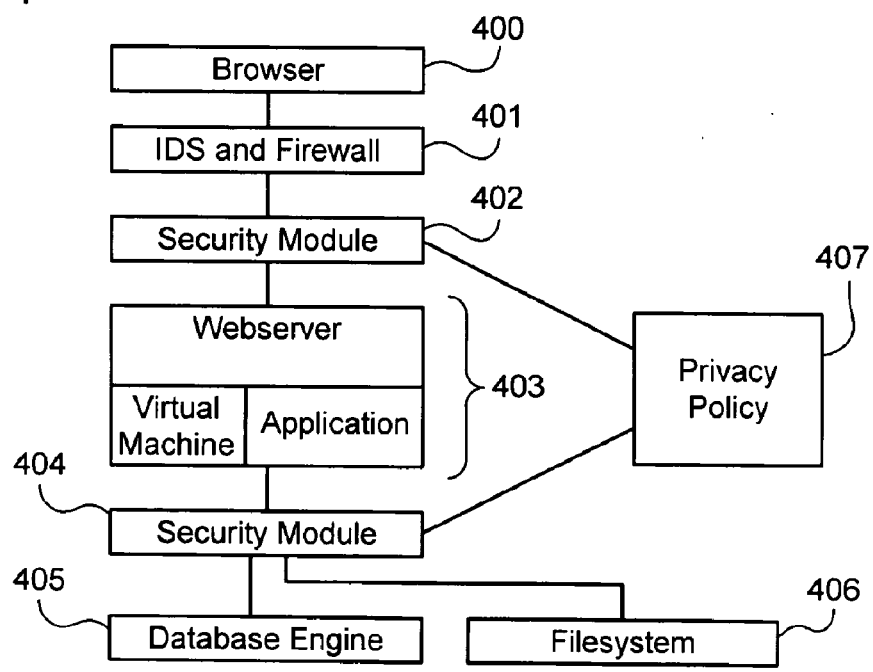
FIG. 4 is a block diagram depicting the architecture and information flow of a two tier web application having security and privacy policy modules.

FIG. 4 shows an example of the present invention implemented in a two-tier web application. Generally speaking, the present invention modifies an execution environment for a scripting language, e.g., a virtual machine in the front/middle end 403 of the web application, in order to include its original functionality, plus additional functions and modules that implement security and privacy policies.

These added functions may include modules, which may be generically referred to as "security modules," (e.g., 402 and 404) that tag the data supplied to the web application by the user and the data created and/or output by the application. The security modules act to ensure that these tags are associated with the data throughout the entire web application. Using these tags, the present invention seeks to block and/or record unauthorized behavior, as established in predefined security policies. The security modules also apply tags to implement a predefined privacy policy, which determines how data may properly be distributed by the web application.

Potential attackers may appear as arbitrary web users (e.g., 101) connected to the front end 403 of the web application through their web browsers 400. As discussed above, when a user issues a page request, the firewall/IDS 401 analyzes the request and lets it pass or blocks it based on conventional security parameters. As discussed below, a first security module 402 is implemented in the augmented execution environment of the scripting language, e.g., a virtual machine, where the front/middle end 403 runs, so that the first security module 402 is functionally positioned between the firewall/IDS 401 and the front/middle end 403 of the web application (as depicted in FIG. 4), thereby intercepting data passing between the user and the web application.

As further discussed below, the security module 402 tags every piece of data that is stored in internal variables in the web server "user-provided," so that a security and privacy policy can be effected with respect to the data. The security and privacy policy configuration may be stored in a privacy policy module 407. As a further example, all the data coming from a particular input field, from a given web page generated by the web application, may be tagged as "private."

As further discussed below, a second security module 404 is implemented so as to be functionally positioned between the front/middle end 403 and the back end APIs (e.g., 405 and 406). This second security module 404 thereby intercepts data generated by or retrieved by the back end APIs, before the data is passed to the front/middle end 403 to be output by the web application. The data retrieved from the back end APIs (e.g., 405 and 406) is tagged as "user-provided." Likewise, the front/middle end 403 web application may retrieve stored tags for elements stored, such as data stored in the databases 405, files stored in the filesystem 406, etc. Tags may be assigned, for example, on a per column basis in a database 405, and per file basis in the filesystem 406.

For example, the second security module 404 analyzes all commands sent from the front/middle end 403 to the database 405 API and detects attempted database-injection attacks by parsing these commands and having a lexical analyzer decide whether an attack is taking place based on the characters contained in these commands and their "user-provided" tag. The security policy includes the option to block these database commands and/or record them in a log file.

Figure 5:
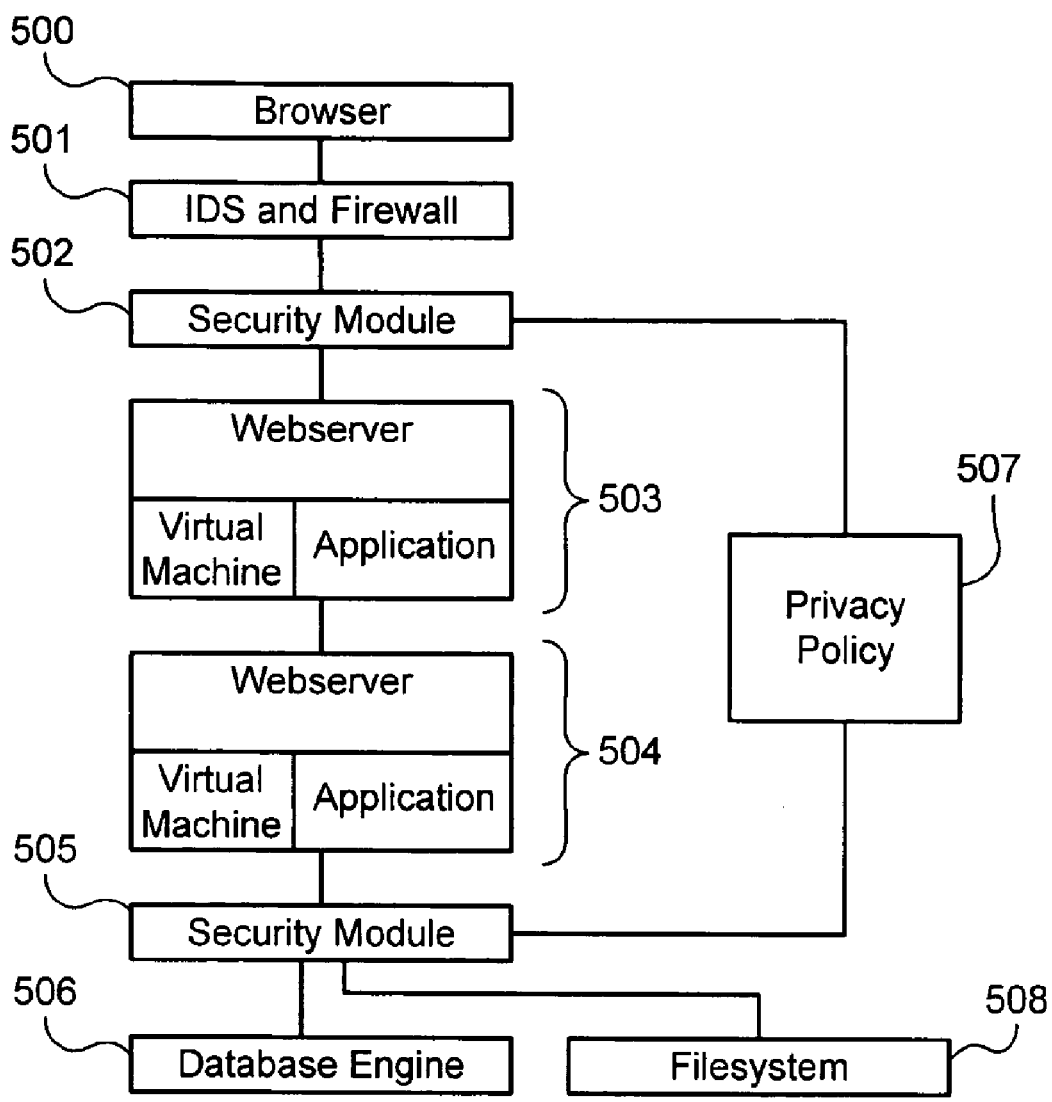
FIG. 5 is a block diagram depicting the architecture and information flow of a three tier web application having security and privacy policy modules.

FIG. 5 shows an example of the present invention implemented in a three-tier web application. As above, the user runs a web browser 500, which interfaces with a firewall/intrusion detection system (IDS) 501. A first security module 502 is implemented in the virtual machine of the scripting language of the front end 503, so as to be functionally positioned between the firewall/IDS 501 and the front end 503 of the web application (as depicted in FIG. 5), thereby intercepting data passing between the user and the web application. A second security module 505 is implemented so as to be functionally positioned between the middle end 504 and the back end APIs (e.g., 506 and 508). This second module 505 thereby intercepts data generated by or retrieved by the back end APIs, before the data is passed to the middle end 504, and in turn to the front end 503, to be output by the web application. The first 502 and second 505 security modules may be configured to communicate with a privacy policy module 507, which contains the security and privacy policy configuration information.

The tagging of data and the manner in which tagged data is handled by the web application is controlled by security and privacy policies, which are established by a person responsible for the security and privacy of the web site, e.g., a security officer. To implement the security policy, the security officer chooses the action to be taken in the event of particular types of attacks, such as, for example, one of "allow," "block," or "remove sensitive information and allow," and one of: "log" or "do not log."

As discussed above, the present invention also provides the capability to implement a privacy policy for securing sensitive information. The security officer is able to:

Assign, in a configuration phase, a privacy tag to inbound data according to its source (i.e., the assignment is per source), e.g., as determined by a fixed column in a fixed database, or a file or directory in the file system, or a field in a web form. Tags may include boolean variables such as "private," "do not store," "for this user's eyes only," etc.

Assign an "output descriptor" to each pair of target (e.g., destination to which the web application sends data) and the method it uses. This includes, for example, APIs in the back end and web pages as targets, and mysql, http-post, and http-get as methods.

Define privacy rules that establish the criteria for blocking and/or logging outbound data. A rule is defined by a set of privacy tags and an output descriptor (the rules may be ordered, i.e., from top to bottom).

The privacy policy is implemented by deciding how data entering through a specific inbound operation should be tagged. Inbound operations are defined by a pair of "target" and "method," in which the "target" might be, for example: any user, an API in the back end, etc., and a method might be, for example: "http-post," "http-get," "mysql," etc. The privacy policy also defines the action to be taken if internal data with a particular tag is being output through a particular outbound operation. Outbound operations are defined by a pair of "target" and "method," in which the target might be, for example: a specific user, any user, an API in the back end, etc., and a method might be, for example: "http-post," "http-get," "mysql," etc.

The data tagging is implemented in the augmented execution environment of the web application so that all tags are persistent, i.e., they cannot be tampered with or erased after data manipulation. Specifically, in operations involving tagged data, e.g., concatenation of string data, the results are tagged according to algorithms to maintain the proper classification of the original data. In the following example, variables are depicted, without loss of generality, through the abstract representation: (type, value, tag). In this example, only the value of the "user-provided data" tag depicted, and t stands for true (i.e., the data is tagged as "user-provided") and f stands for false. When concatenating the following variables:

|  | Variable 1 | Variable 2 |
|---|---|---|
| Type: | string | string |
| Value: | Hello | ; drop table |
| "User-provided" tag: | f, f, f, f, f | t, t, . . . , t, t, t. | the following result is produced:

| Type: | String |
| Value: | Hello; drop table |
| "User-provided" tag: | f, f, f, f, f, t, . . . , t, t, t. |

Thus, "user-provided" tags is properly propagated, so that characters ";drop table" remain tagged as "user provided."

As shown in FIG. 6, a configuration language and format is provided that allows the security officer define security and privacy policy, which may be implemented, for example, in the form of an extensible markup language (XML) schema using a standard editor. In the present example, the security officer has specified security rules that block and log attempts for certain types of attacks: database-injection ("<SQL_injection block="true" log="true"/>"); shell-code injection ("<shell_injection block="true" log="true"/>"), directory-traversal ("<directory_traversal block="true" log="true"/>"), and cross-site scripting ("<XSS block="true" log="true"/>"). The mechanisms for detecting these types of attacks are further discussed below. These mechanisms may also be implemented as XML schemas or using other high-level languages.

The security officer has defined seven inbound descriptors, i.e., one for the database engine and one for each sensitive field in the web form of FIG. 7. These are represented in the schema under the headings "<descriptors>" and "<inbound>," as follows: "<descriptor name="database" . . . />" for the database engine and "<descriptor name="login.job.title" . . . />" for the "Job Title" field of the web form. The security officer has also defined two outbound descriptors, i.e., one for the database engine "<descriptor name="database" . . . />" and one for arbitrary webpages "<descriptor name="anyHTML" . . . />."

In addition, the security officer has established certain data tagging rules, under the heading "<rules>" and "<tagging>," that all inbound data coming from the sensitive fields in the login webpage is tagged as private ("<rule from="login.job.title, . . . tagAs="private=yes, storeAllowed=yes"/>").

Blocking rules (under the heading "<blocking>") are established based on the data tagging and/or destination of the outbound data. For example, "private" data is blocked from being sent to web users and logged: "<rule to="anyHTML" when TaggedAs="private=yes" do="block,log"/>," and data tagged as "do not store" is blocked from being sent to the database engine: "<rule to ="database" when TaggedAs="do.not.store=yes" do="block"/>." These rules also may specify other security/privacy actions, such as whether the outbound data is to be logged.

Referring again to FIG. 7, the present invention allows users to visualize the privacy policy by presenting icons in the input web form next to each entry field, which indicate how each field is to be treated by the web application. For example, the first three input fields: "Salutation," "First Name," and "Last Name," are to be tagged as "public." The next three input fields: "Job Title," "Email Address," and "Phone Number," are to be tagged as "private." The seventh field, "Industry," is to be tagged as "aggregated data." The icons are provided via a browser plug-in, which the user has previously installed. The plug-in reads specially-suited HTML tags that are inserted in the web page by the web application before it is sent to the user.

Figure 8:
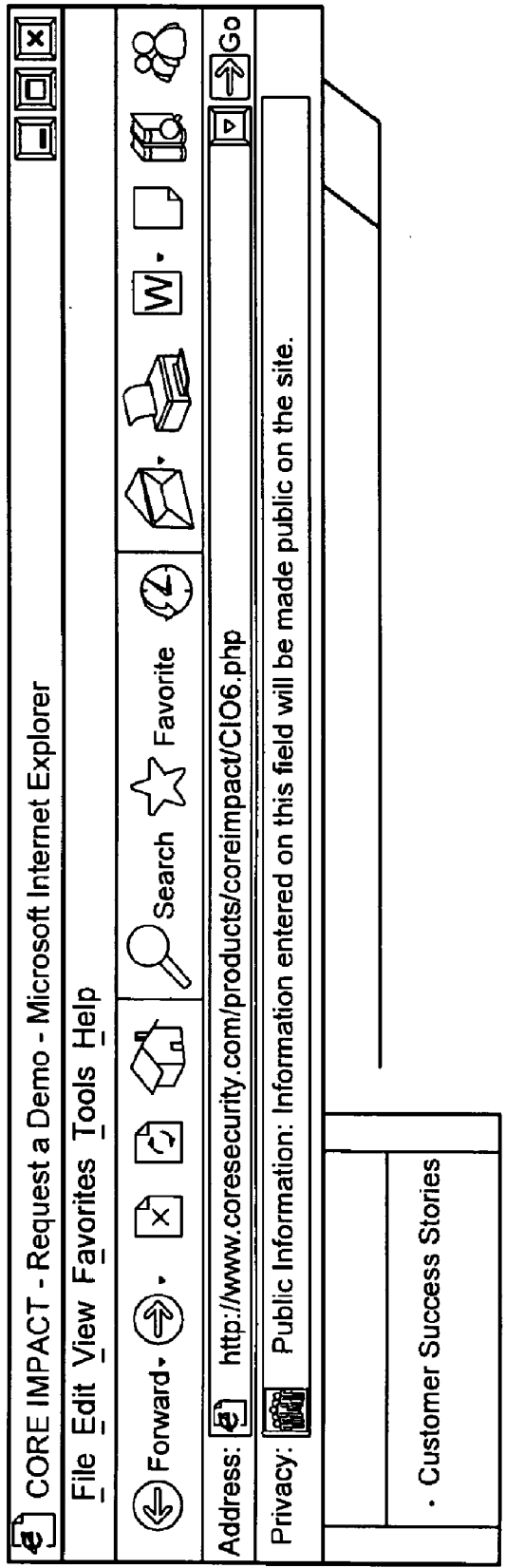
FIG. 8 is a screen image of a toolbar for a browser incorporating a plug-in to allow visualization of security and privacy policies.

In addition, as shown in FIG. 8, the plug-in may also provide a toolbar in the top portion of the user's web browser, which provides an explanation of the significance of each privacy icon to the user. For example, as the user clicks on a particular input field to begin data entry, the toolbar displays the tagging associated with that field, e.g., "private," and then provides a brief description of how "private" data will be handled by the web application.

The browser plug-in may also allow users to modify the privacy policy. For example, the user may be able to click on a privacy icon of a particular input field to display a menu of selectable options that have been predefined by the web application for that input field. So, for example, the user may change the privacy tagging of the name entry fields from "public" to "private." This change is then transmitted by the plug-in to the web application so that the privacy policy can be updated and the input data can be properly tagged upon receipt of the web form data.

As discussed above, security attack attempts are thwarted by intercepting and potentially blocking data being sent between the user and the front/middle end 403 of the web application or between the front/middle end 403 and a back end API. The following are specific examples of how particular types of attacks may be handled.

Database-command injection attack attempts are detected by a lexical analyzer embedded in the second security module, which receives character strings sent between the front/middle end 403 and the database API. The analyzer detects an input string as an attack unless:

all characters tagged as "user provided" are between quotes and are included in the set: A-Z, a-z, or 0-9, or constitute (as a whole) a negative number; and for each quote character that is tagged as "user-provided," there is an accompanying closing quote character that is also tagged as "user-provided."

For example, if a user enters "; drop tables" in a web form input field, and the web server sends this to the database engine, then the lexical analyzer identifies this as an attack attempt, because the character ";" is forbidden as an input provided by a user. According to the security policy discussed above with respect to FIG. 6, such an attack attempt will be blocked and documented in a log entry.

Cross-site scripting attack attempts are detected by a special-purpose lexical analyzer embedded in the second security module that analyses all web pages sent from the front/middle end 403 of the web application to a user. The analyzer determines that an attack is taking place if a webpage contains characters that are tagged as "user-provided" and that constitute an HTML tag. For example, if a user enters: "<A HREF="www.myevilwebpage.com">hello </A>" in an input field of a web form, and the web application sends this to any user as part of a web page, and so the module 502 identifies this as an attack attempt. In the case of the present example, according to the configuration FIG. 6 the invention will block this attack attempt and write a log entry describing this incident.

Directory-traversal attacks are detected by a lexical analyzer embedded in the second security module, which identifies as an attack attempt any command sent from front/middle end 403 of the web application to the filesystem that contains a "user-provided" character within the set ".", "..", and "%".

Shell-command injection attacks are detected by a lexical analyzer embedded in the second security module, which identifies as an attack attempt any command sent from the front/middle end 403 of the web application to the shell API in the file system 508 that contains a "user-provided" character within the set "|", """, " ", ">", "<".

The types of attacks discussed above are merely exemplary. The security officer can configure, for each type of API employed on the web server, the tools for parsing and analyzing (by either a lexical analyzer or the use of context-free grammar) the authorized input for the particular API, thereby allowing the security module to determine whether an attack is taking place. This configuration may be done, for example, by embedding a lexical analyzer inside the underlying API. As above, the security policy may be set up to block and/or log attack attempts directed at the particular API.

As discussed above, the system of the present invention enhances security and privacy for web-based applications by modifying or augmenting the execution environment (EE) for the web application in order to include data-tracking information. The augmented execution environment (AEE), referred to above, is an enhancement of the execution environment of the EE, but its data structures (e.g., internal objects) and data-manipulation rules (e.g., defined interface layer) are modified to allow security and privacy policy enforcement.

The (instantiated) data structures handled by the EE or the AEE, e.g., numbers, characters, or strings, in local or global variables, and function parameters, may be referred to as objects. One may assume, without loss of generality, that the structure for any object in the EE is represented by a 2-tuple consisting of type and value. For example, the number 63 is represented by the 2-tuple (integer, 63). Objects in the AEE are augmented, and represented by 3-tuples, including type, value, and privacy tag. A privacy tag consists in a sequence of 8-tuples of the following boolean variables: public, store allowed, plaintext, owner only, aggregated data, free5, . . . , free8—where free5, . . . , free8 are left to be defined by the security officer. Tagging is done according to "operations," as further discussed below.

Every manipulation with objects is called an operation, for example: inbound operations (i.e., inbound with respect to the execution environment), which are the operations that accept input directly from web users, back-end storage, or web services and result in the creation of an object in the AEE; outbound operations (i.e., outbound with respect to the execution environment), which are the operations where the AEE "sends" information (e.g., objects) to APIs or web users; and internal operations, which consist in computations with objects within the AEE.

On executing an inbound operation the AEE assigns a privacy tag to each of the associated objects according to the privacy policy, and depending on its source. On executing an outbound operation the AEE can block the associated object from being output and/or log this action, according to the privacy policy, and depending on its privacy tag, destination, and syntax of the associated object(s). The relationship that inbound and outbound operations have with privacy policies is further discussed below.

Internal operations either create a new object or reassign values to existing objects. The AEE tags these objects according to privacy propagation rules, which are implemented with respect to a lattice structure on the set of all possible privacy tags (they establish what is the tag for new or reassigned objects).

This may be exemplified, for simplicity, and without loss of generality, by binary operations. Let A denote a binary operation, and let $c:=(t_c, v_c):=A(a,b)$ be the result of applying operation A to the objects $a:=(t_a, v_a)$ and $b:=(t_b, v_b)$ in the execution environment. Let $a'=(t_a, v_a, tag_a)$ and $b'=(t_b, vb, tag_b)$ be defined by adding privacy tags to a and b. Then this operation is modified by the AEE, so that it produces the augmented object, $A(a', b'):=c':=(t_c, v_c, tag_c)$ where $t_c, v_c$, are those defined above and $tag_c$ is computed as $tag_c:=tag_a$ AND $tag_b$ (where the AND operation is calculated boolean by boolean). For example, if public=true in $tag_a$ and public=false in $tag_b$, then public is set to (true AND false)=false in $tag_c$, which expresses the fact that object c contains information that is private. These rules define the lattice structure mentioned above.

Internal operations manipulating strings receive exceptional treatment, because they tag results with sequences of 8-tuples, one per character. For example, string concatenation is modified in order to construct the privacy tags for the new object accordingly. That is, given the string "hello" with every character tagged with the variable public=true and given the string "john" with every character tagged with the variable public=false, their concatenation will return the string "hello john", where the first six characters are tagged with the variable public set to true and the last four characters are tagged with public set to false. To avoid storage and performance penalties, the tool uses a single tag for the string in case all the characters are tagged alike. Internal operations that compute cryptographic functions, e.g., encrypt or hash, are also exceptional and return a single object tagged with the variable encrypted set to true.

An input descriptor may be defined as a pair: input type and target URL. The former describes the method in the platform executing an inbound operation, e.g., http-post, http-get or mysql. The latter describes the parameter for that method, e.g., a field in a web form, a field in a database table, a file or directory. It may include wild-cards or be empty in order to specify the default behavior. An output descriptor also may be defined as a pair: output type and target URL. Likewise, the former describes the component in the platform (or back end) executing the outbound operation, while the latter describes the elements affected. Privacy rules establish what outbound operations should be allowed or blocked, logged or not, according to the privacy tags and syntax of the object associated to the outbound operation. A privacy rule consists of an output descriptor, a set of privacy tags, a syntactic description (e.g., only numbers, not in {/, ", &, —}), and an action to be executed (e.g., accept, block, remove sensitive information and accept, and/or log).

During configuration, the security officer may execute the following steps: (i) list the input descriptors, enumerating every possible inbound operation; (ii) assign a privacy tag to each input descriptor; (iii) list the output descriptors enumerating every possible outbound operation; and (iv) define the privacy rules. Steps (i) and (ii) configure the AEE, so that it adds a privacy tag to every object associated to an inbound operation. After this is done, the AEE parses the code for the web application and adds HTML tags to the portion of code associated to an input descriptor. When the web application is running, and as users are requested to enter information, this enables the users to be informed as to the privacy rules associated to each piece of requested data. Steps (iii) and (iv) let the security officer define the action to follow for every different outbound operations. Configuration details are stored in a readable file that is accessible by the AEE. The AEE evaluates the privacy rules in order, and applies the first matching rule.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims.

We claim:

1. A method, executing on hardware, for implementing privacy protection in a web application, wherein the web application is executed in a web application language execution environment within a web server, the method comprising:

establishing at least one inbound tagging rule for tagging objects entering the web application language execution environment, referred to as inbound objects, according to a respective source of each of the inbound objects;

assigning a tag to at least one of the inbound objects being operated on by the web application language execution environment based on the at least one inbound tagging rule;

establishing at least one privacy rule for performing privacy actions on at least one object that is outbound from the web application language execution environment, referred to as outbound objects, according to a respective tag of each of the outbound objects; and performing a privacy action on the at least one outbound object being operated on by the web application language execution environment based on the at least one privacy rule;

detecting at least one attack which violates the at least one privacy rule, wherein the detection of the attack comprises a lexical analysis of the data of the object being operated on by the web application language execution environment checking the tags assigned to the outbound object.

2. The method of claim 1, wherein the source of each of the inbound objects is represented by a data structure comprising a method of executing an inbound operation and a target of the method of executing an inbound operation.

3. The method of claim 2, wherein the method of executing an inbound operation comprises at least one of: http-post, http-get, and database access.

4. The method of claim 2, wherein the target of the method of executing an inbound operation comprises at least one of: a user, a field in a web form, a field in a database, a file, or a directory.

5. The method of claim 1, wherein the at least one privacy rule for performing privacy actions on outbound objects is established according to a respective destination of each of the outbound objects.

6. The method of claim 5, wherein destination of each of the outbound objects is represented by a data structure comprising a method of executing an outbound operation and a target of the method of executing the outbound operation.

7. The method of claim 6, wherein the method of executing an outbound operation comprises at least one of http-post, http-get, and database access.

8. The method of claim 6, wherein the target of the method of executing an outbound operation comprises at least one of: a user, a web page address, and a back-end application.

9. The method of claim 5, wherein the at least one privacy rule specifies a type of privacy violation, detection of which initiates the privacy action.

10. The method of claim 1, wherein the privacy action comprises at least one of: blocking output of the object, allowing output of the object, removing sensitive information and allowing output of the object, and logging output of the object.

11. The method of claim 1, wherein the privacy action comprises assigning a tag to the object as it flows from the web application language execution environment to a database back end or vice versa.

12. The method of claim 1, wherein the privacy action comprises assigning a tag to the object as it flows from the web application language execution environment to a user's web browser or vice versa.

13. The method of claim 1, wherein the assigned tag comprises at least one of: private, public, aggregated data, do not store, for this user's eyes only, and user-provided.

14. The method of claim 1, further comprising performing an internal operation on the object being operated on by the web application language execution environment to generate at least one new object, wherein data of the at least one new object is tagged in a manner consistent with the object from which the at least one new object is generated.

15. The method of claim 1, further comprising presenting to a user indicators on input fields of a web form indicating the tag associated with each of the input fields in accordance with the at least one inbound tagging rule.

16. The method of claim 15, wherein the indicators are presented via a plug-in in the user's web browser.

17. The method of claim 15, further comprising providing an explanation of the significance of the indicators to the user.

* * * * *